United States Patent [19]

Dolle

[11] Patent Number: 5,109,757
[45] Date of Patent: May 5, 1992

[54] APPARATUS FOR THE TEMPORARY RETENTION OF A PLURALITY OF SKEWERS, SUCH AS A LOADING APPARATUS OF A SKEWERING MACHINE

[76] Inventor: Jacques Dolle, Chemin de Bel Air, Impasse d'Eden, 30650 Rochefort du Gard, France

[21] Appl. No.: 682,905

[22] Filed: Apr. 9, 1991

[30] Foreign Application Priority Data

Apr. 10, 1990 [FR] France ................. 90 04579

[51] Int. Cl.$^5$ .................... A22C 17/00; A22C 17/02
[52] U.S. Cl. .................... 99/419; 99/421 R
[58] Field of Search ........ 99/450.1, 494, 419, 99/421 R, 420, 443 C, 421 H; 452/149, 174; 227/139; 83/466.1; 29/432; 426/421

[56] References Cited

U.S. PATENT DOCUMENTS

| | | | |
|---|---|---|---|
| 2,303,566 | 12/1942 | Majestic | 99/419 |
| 3,405,422 | 10/1968 | Sico | 99/419 |
| 3,691,608 | 9/1972 | Lowrance | 227/139 |
| 3,729,774 | 5/1973 | Chow | 99/420 |
| 3,835,761 | 9/1974 | Yamanaka | 99/443 C |
| 4,440,071 | 4/1984 | Boosalis et al. | 99/420 |
| 4,583,263 | 4/1986 | Wigley, Jr. | 99/419 |
| 4,604,771 | 8/1986 | Dolle | 99/419 |
| 4,837,895 | 6/1989 | Emsens | 99/419 |
| 4,893,553 | 1/1990 | Emsens | 99/421 R |
| 4,934,026 | 6/1990 | McNerney | 99/419 |

FOREIGN PATENT DOCUMENTS

| | | |
|---|---|---|
| 0078232 | 10/1982 | European Pat. Off. |
| 0113637 | 7/1984 | European Pat. Off. |
| 2494092 | 5/1982 | France |
| 2634982 | 2/1990 | France |

*Primary Examiner*—Timothy F. Simone
*Attorney, Agent, or Firm*—Blakely, Sokoloff, Taylor & Zafman

[57] ABSTRACT

Apparatus for the temporary retention of a plurality of skewers having a block-shaped body. The body comprises a plurality of bores and a slide, mounted slideably within the body. The slide has a plurality of holes which can be oriented either coaxially with the bores of the body to allow free passage of the skewers or offset relative to the bores of the body. The slide passes through the body at an intermediate level of the bores in such a way that a substantial portion of the bores is located respectively on either side of the slide and can receive a corresponding portion of a skewer passing through a hole of the slide between these two portions. The immobilization of each skewer in a respective bore of the body is achieved as a result of a bearing of the slide in the respective hole, particularly by way of a material elastically compressible and/or having a high coefficient of friction.

10 Claims, 3 Drawing Sheets

FIG_2

APPARATUS FOR THE TEMPORARY RETENTION OF A PLURALITY OF SKEWERS, SUCH AS A LOADING APPARATUS OF A SKEWERING MACHINE

BACKGROUND OF THE INVENTION

The present invention relates to an apparatus for the temporary retention of a plurality of skewers, such as a loading apparatus of a skewering machine, the said apparatus comprising:
- a body having a plurality of bores passing right through it along respective mutually parallel longitudinal axes and occupying specific relative positions, each of the said bores being capable of receiving a respective skewer with a possibility of relative longitudinal sliding, this skewer being maintained in a longitudinal orientation,
- a transverse slide mounted slideably relative to the body in a specific transverse direction and having as many holes as there are bores of the body, the said holes passing right through it along respective mutually parallel longitudinal axes and occupying relative positions identical to the said specific relative positions, each of the said holes being capable of receiving a respective skewer with a possibility of relative longitudinal sliding, in such a way that, as a result of the sliding of the slide in relation to the body in the said transverse direction, the slide can be placed, as desired, in a first position, in which the axes of the holes of the slide coincide with the axes of the bores of the body to allow a free longitudinal passage of the skewers, or in a second position, in which the axes of the holes of the slide are offset transversely a specific way of the said transverse direction in relation to the axes of the bores of the body in order to immobilize the skewers against longitudinal passage.

In a known embodiment marketed by the Applicant, the body has general form of a right-angled parallelpiped comprising two approximately square plane transverse faces connected to one another by means of a longitudinal end face; the slide is mounted slideably relative to the body in the immediate vicinity of one of the transverse faces of the latter, in such a way that each bore of the body is located completely or almost completely on the same side of the slide which, in its second position, possesses facing these bores of the body solid zones intermediate between its holes, in such a way that the skewers introduced into the bores of the body come with one end up against the slide and are maintained in a longitudinal orientation as a result of the interaction of a portion immediately adjacent to this end with the respective bore of the body.

This known embodiment has some disadvantages.

One of these disadvantages is that, in its second position, the slide, although opposing a sliding of the skewers one specific way in a longitudinal direction going from the bore of the body towards the slide, nevertheless does not ensure any retention of the skewers in the opposite way of this longitudinal direction, with the result that, if the apparatus is to be manipulated, it is expedient to make sure that it is oriented in such a way that the transverse face of the body nearest the slide is turned downwards.

Moreover, insofar as the end by which each skewer bears on the slide in a second position is generally a pointed end for the purpose of assisting the subsequent penetration of the skewers into food products to be skewered or into skewering tubes, as described respectively in French Patens No. 2,494,092 and 2,515,023 of the Applicant, this actual bearing and the friction occurring as a result between the skewers and the slide reaching its first position can blunt or curve the points of these skewers, to the extend of impairing their subsequent engagement into the products to be skewered or into the skewering tubes, or even scratch the slide at the risk of producing on it zones difficult to clean, that is to say liable to accommodate bacteria.

To overcome these disadvantages, it was proposed to replace the slide by a diaphragm stationary relative to the body and possessing opposite the bores of the latter holes suitable for allowing the passage of the skewers; but these holes are undersized transversely in relation to the skewers, with the result that they widen when these are engaged in them, and retain them by tending to close on them again as a result of the natural elasticity of the diaphragm.

However, as it is generally known, a diaphragm is vulnerable to tears and to aging, and therefore such an apparatus has only a short lifetime; furthermore, although it is true that it has the advantage of ensuring a retention of the skewers both ways longitudinally, the release of the skewers can be obtained only as a result of a forced push exerted on them by means capable of penetrating into the bores as far as the diaphragm, that is to say by ejection rods, thereby giving rise to a complexity of construction of the machines with which such an apparatus is intended to interact.

SUMMARY OF THE INVENTION

The object of the present invention is to overcome these disadvantages, and to achieve this the present invention provides an apparatus of the type mentioned in the preamble, wherein the slide passes through the body at a longitudinally intermediate level of the bores of the latter, in such a way that a substantial portion of each bore of the body is located respectively on either side of the slide and can receive a respective portion of a skewer engaged in this bore, whilst another portion of this skewer is engaged in a corresponding hole of the slide when the slide occupies its first position, wherein each hole of the slide is partially in register with the corresponding bore of the body when the slide occupies its second position, in such a way that the slide can occupy its second position when a skewer has a respective portion in this hole of the slide and in each portion of the corresponding bore of the body, and wherein the slide possesses, at the edge of each hole, at least in a localized manner on the upstream side of this hole with reference to the said specific way, a means for bearing transversely the said specific way against a skewer having a respective portion in this hole of the slide and in each portion of the corresponding bore of the body when the slide occupies its second position, in order to immobilize this skewer frictionally against longitudinal passage.

Such an apparatus is of a simplicity and robustness comparable with those of the apparatus marketed at the present time by the Applicant and discussed above, and it cannot cause any damage to the skewers, especially in the region of their points, nor can the slide be damaged by these, and in the second position the slide retains the skewers effectively against sliding both ways; however, the change of the slide into the first position completely releases the skewers which, in particular, can slide by gravity onto the outside of the bores of the body if the apparatus is oriented in such a way that the said longitudinal direction is approximately vertical; the apparatus according to the invention is therefore compatible with any type of manipulation and can interact with any skewering machine in order to perform an automatic loading of such a machine, even if this is not equipped with the ejection rods necessary for the use of a diaphragm-type retention apparatus.

It is possible for the transverse bearing means which the slide possesses at the edge of each hole to be formed in one piece with the slide, in practice by a face of the latter delimiting the hole.

Preferably, however, the said transverse bearing means is a buffer of a material having a high coefficient of friction and/or elastically compressible, attached fixedly to the slide; consequently, the repeated use of the apparatus does not risk causing damage to the slide itself, such possible damage being limited to the buffers which can be replaced at less cost when the need arises; moreover, the choice of an elastically compressible material for the buffer makes it possible, on the one hand, to avoid any risk of damage to the skewers in the region of their portion interacting with this buffer inside the hole of the slide in the second position and, on the other hand, to ensure an effective retention of skewers which have wide tolerances in terms of their cross-sectional dimensions.

Likewise for the purpose of avoiding any risk of damage to the skewers, the slide preferably passes through the body at a level corresponding approximately to half of each bore of the body, with the result that the skewers can bear on the latter in a manner equally distributed on either side of the slide when the latter occupies its second position.

To make it easier to manipulate the apparatus according to the invention for the retention of skewers, this apparatus preferably comprises means for locking the slide relative to the body, as desired, when the slide occupies its second position; any risk of the inopportune release of the skewers is thus avoided; however, to make sure that the slide effectively reaches its first position for releasing the skewers when this is desired, means are preferably provided for returning the slide elastically the opposite way to the said specific way of the said transverse direction, that is to say from its second position to its first position, and there are stop means opposing the sliding of the slide the said opposite way in relation to the body beyond the said first position.

During the introduction of the skewers into the bores of the body and into the holes of the slide, to prevent them from coming up against the latter, each hole of the slide preferably has a diameter larger than the diameter of the corresponding bore of the body, this diameter corresponding approximately to that of the cross-section of a skewer, than which it is slightly larger, however, in order to make it possible to introduce slightly bent skewers into the bores; in this case, preferably, the portions of each bore of the body which are located downstream of the slide, with reference to a specific longitudinal way of longitudinal sliding of the skewers corresponding to a way of introduction of these into the bores and the holes, are widened in the upstream direction with reference to this way, in order to prevent the skewers from coming up against these portions of the bores after they have passed through the holes of the slide.

Furthermore, to make it easier to introduce the skewers into the bores of the body, the portions of each bore of the body which are located upstream of the slide with reference to a specific longitudinal way of longitudinal sliding of the skewers are preferably widened in the upstream direction with reference to this way.

Of course, the apparatus according to the invention can, moreover, have any arrangement suitable for making it easier, where appropriate, for it to cooperate with other apparatuses, and in particular the body can advantageously have means for positioning in relation to an apparatus for distributing skewers among the said bores and/or in relation to a skewering machine.

Further characteristics and advantages of an apparatus according to the invention will emerge from the following description relating to a non-limiting exemplary embodiment and from the accompanying drawings which form an integral part of this description.

DETAILED DESCRIPTION OF THE INVENTION

Figure 1:
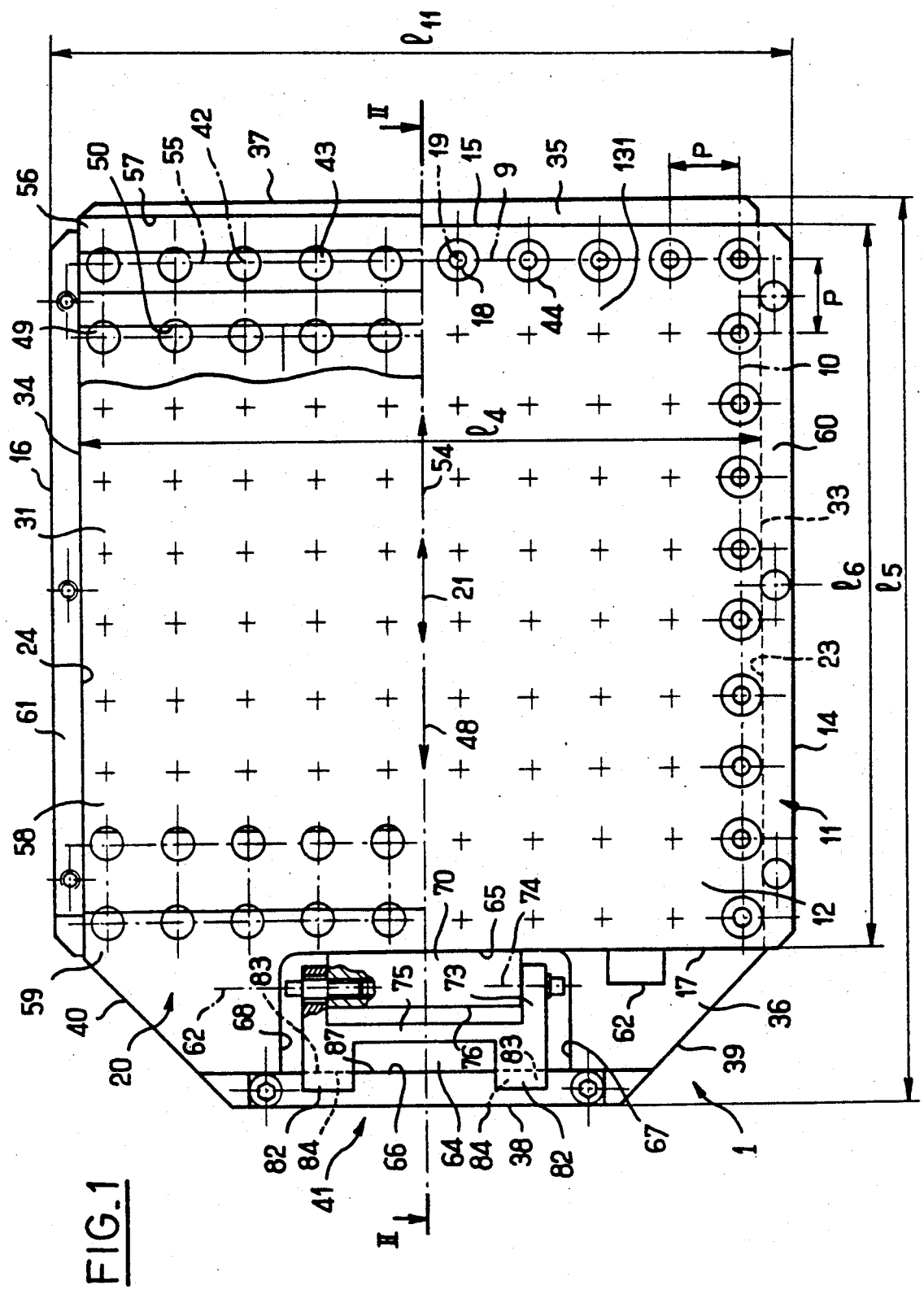
FIG. 1 shows an apparatus for the temporary retention of a plurality of skewers for use as a loading apparatus of a skewering machine, partially in a front view and partially in section in two half-planes designated by I—I in FIG. 2.
Figure 3:
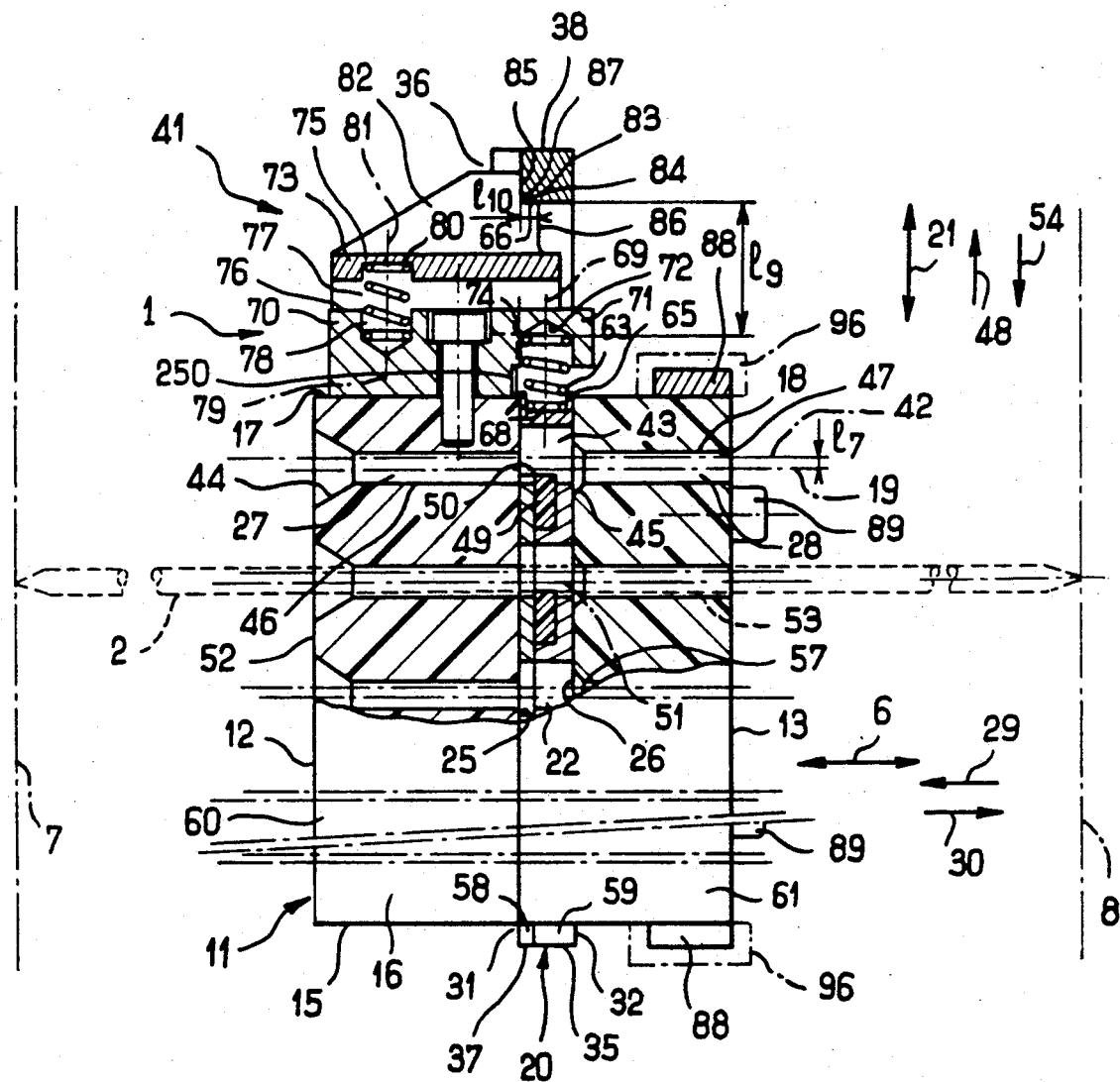

Reference will first be made to FIGS. 1 and 3 which illustrate an apparatus 1 for the temporary retention of a plurality of skewers 2 for use as a loading apparatus of an automatic skewering machine (not shown) known per se, but it goes without saying that an apparatus according to the invention could interact with other apparatuses using skewers, without thereby departing from the scope of the present invention.

It is known that the skewers 2 used for carrying out skewering on automatic skewering machines are generally made of wood and in the free state have, with wide tolerances, an approximately rectilinear shape, that is to say an approximately rectilinear mid-axis 3, an approximately specific length L along this mid-axis 3 and an approximately constant cross-section, for example approximately circular, of approximately specific diameter d perpendicularly to this mid-axis 3; however, each skewer 2 has two ends 4, 5 sharpened to a point.

The apparatus 1 is intended for receiving and retaining a plurality of skewers 2 in a specific relative position which they are to occupy in a skewering machine and in which their mid-axes 3 are arranged approximately in the same longitudinal direction 6, their ends 4 are arranged approximately in the same transverse plane 7 perpendicular to this longitudinal direction 6, and their ends 5 are arranged approximately in the same transverse plane 8 perpendicular to the longitudinal direction 6, whilst at least in a localized manner in the region of the apparatus 1 the axes 3 are arranged in mutually perpendicular rectilinear rows 9, 10, in which they are spaced from one another at the same interval p larger than the diameter d, for example of the order of four times this diameter d, this figure being given only as a non-limiting example.

For this purpose, he apparatus 1 comprises a body 11 having the general form of a right-angled parallelepiped delimited particularly by two plane main faces 12, 13 of identical shape, for example approximately square, connected to one another by means of four likewise plane end faces 14, 15, 16, 17 perpendicular two by two and to the main faces 12, 13; the main faces 12, 13 are transverse, that is to say perpendicular to the longitudinal direction 6, whilst the end faces 14, 15, 16, 17 are longitudinal, that is to say parallel to this longitudinal direction 6.

In parallel with this longitudinal direction 6, the body 11 is pierced right through, that is to say from its main face 12 to its main face 13, with a plurality of mutually identical rectilinear bores 18 having respective axes 19 parallel to the longitudinal direction 6, that is to say perpendicular to the main faces 12 and 13, and distributed according to the abovementioned rows 9, 10, in which they are spaced from one another at the abovementioned interval p; each of the rows 9 and 10 thus has 10 bores 18 in the example illustrated, on the understanding that this figure is only a non-limiting example and that the rows 9 and 10 can have any desired, possibly different, respective number of bores 18. The bores 18 are intended to allow a longitudinal sliding of respective skewers 2 in the body 11, at the same time providing longitudinal guidance for the skewers 2; for this purpose, in view of the tolerances in the shape and dimensions of these skewers 2 when these are made of wood, they have respective shapes rotational about their axes 19 with a minimum diameter $d_1$ slightly larger than the approximate diameter d of a skewer 2, for example of the order of 30% larger than this diameter d, and the longitudinal dimension 1 separating the faces 12 and 13 from one another is substantially smaller than the approximate length L of a skewer 2, for example of the order of one third or one quarter of this, these particulars being given only by way of non-limiting example. Each bore 18 can thus receive a respective skewer 2 with approximate coaxiality and with a possibility of relative longitudinal sliding.

However, means are provided for allowing such a relative longitudinal sliding, or, on the contrary, for opposing it, as required, and these means comprise a flat transverse slide 20 mounted slideably transversely relative to the body 11 in a specific transverse direction 21, that is to say perpendicular to the longitudinal direction 6; moreover, this direction 21 is parallel to the rows 10 and to the end faces 14 and 16 of the body 11, whilst it is perpendicular to the rows 9 and to the end faces 15 and 17 of the body 11.

For this purpose, the body 11 is pierced right through, in the direction 21, with a slideway 22 which opens into its end faces 15 and 17 and which possesses perpendicularly to the direction 21 a constant rectangular cross-section defined by four plane faces perpendicular two by two, namely two faces 23, 24 parallel to the end faces 14 and 16 and located opposite one another and two faces 25, 26 parallel to the main faces 12 and 13 and located opposite one another.

The faces 23 and 24 are located in the immediate vicinity of the end face 14 and the end face 16 respectively, whilst the faces 25 and 26 arranged on the same side of the slideway 22 as the main face 12 and the main face 13 respectively are as distant from these as possible, so that the slideway 22 subdivides each bore 18 into two portions 27, 28 possessing, in the longitudinal direction 6, a respective dimension $l_1$, $l_2$ as close as possible to half of 1, the corresponding dimension $l_3$ of the slideway 22 being comparatively small; thus, in the example illustrated, the dimension $l_1$ of that of the portions of each bore 18 which is located between the main face 12 and the face 25, namely the portion 27, is of the order of half of 1, whilst the corresponding dimension $l_2$ of the portion 28 located between the face 26 and the main face 13 is of the order of 2/5 of 1, and $l_3$ is of the order of 1/5 of 1; however, these proportions are only non-limiting examples, and other proportions could be adopted, without thereby departing from the scope of the present invention, provided that a substantial portion of each bore 18 remains respectively on either side of the slideway 22.

Each of the portion 27 and 28 of each bore 18 has a cylindrical shape rotational about the respective axis 19, with the abovementioned diameter $d_1$, over the major part of its respective dimension $l_1$, $l_2$, respectively from the face 25 (cylindrical zone 46 of the portion 27) and from the main face 13 of the body 11 (cylindrical zone 47 of the portion 28); however, respectively in the immediate vicinity of the main face 12 of the body 11 and in the immediate vicinity of the face 26, each of these portions 27 and 28 widens progressively in the form of a truncated cone rotational about the axis 19, respectively to a diameter $d_2$ much larger than the diameter $d_1$, for example of the order of 3 times $d_1$ (frustoconical zone 44 of the portion 27), and to a diameter $d_3$ intermediate between the diameters $d_1$ and $d_2$, for example of the order of twice $d_1$ (frustonical zone 45 of the portion 28), these figures being given by way on non-limiting example. It will be seen that the two portions 27 and 28 of each bore 18 thus widen the same way 29 of the longitudinal direction 6, this way 29 being opposite to a way 30 forming a predetermined way of introduction of the skewers 2 into the bores 18 and of passage of the skewers 2 through the body 11.

To ensure its abovementioned guidance during sliding in the direction 21 in relation to the body 11, the slide 20 possesses perpendicularly to the direction 21 a cross-section closely complementary with that of the slideway 22, namely a rectangular cross-section defined by two plane main faces 31, 32 parallel to and spaced from one another by a dimension substantially equal to the dimension $l_3$ separating from one another the faces 25 and 26, with which these faces 31 and 32 are in respective sliding contact, and by two plane end faces 33 and 34 connecting these two main faces 31 and 32 to one another and arranged perpendicularly to these and parallel to one another, being spaced from one another at a distance $l_4$, substantially identical to the distance separating from one another the two faces 24 and 23, with which they are in respective sliding contact. In parallel with the direction 21, the slide 20 has a dimension $l_5$ larger than the corresponding dimension $l_6$ of the body 11, that is to say than the dimension separating the end faces 15 and 17 of the latter from one another, in such a way that the slide 20 forms a projection 35, 36 from the slide 20 in the direction 21 respectively in relation to the end face 15 and in relation to the end face 17; in the region of its projection 35 in relation to the end face 15, the slide 20 is delimited between the main faces 31 and 32 by a plane end face 37 perpendicular to the main faces 31 and 32 and to the faces 33 and 34, that is to say also to the direction 21; on the same side as the projection 36, it is partially delimited by a plane end face 38 parallel to the end face 37, this end face 38 being connected respectively to the end face 33 and the end face 34 by means of likewise plane end faces 39, 40 perpendicular to the main faces 31 and 32, but oriented at 45° relative to the end face 38 and relative to the end face 33 or 34 respectively, in such a way that, in the region of its projection 36, the slide 20 narrows progressively towards the outside of the body 11, if it is seen in the region of either one of its main faces 31 and 32 or between these. In particular, the projections 35 and 36 allow the slide 20 to be operated so that it slides in the direction 21 in relation to the body 11, the projection 36 carrying, furthermore, means 41 for locking the slide 20 in a predetermined relative position in relation to the body 11, as required, as will appear later.

To allow the skewers 2 to pass through the body 11 via the bores 18 of the latter, the slide 20 is pierced right through, along respective axes 42 perpendicular to its main faces 31 and 32, with as many holes 43 as there are bores 18 of the body 11

Figure 2:
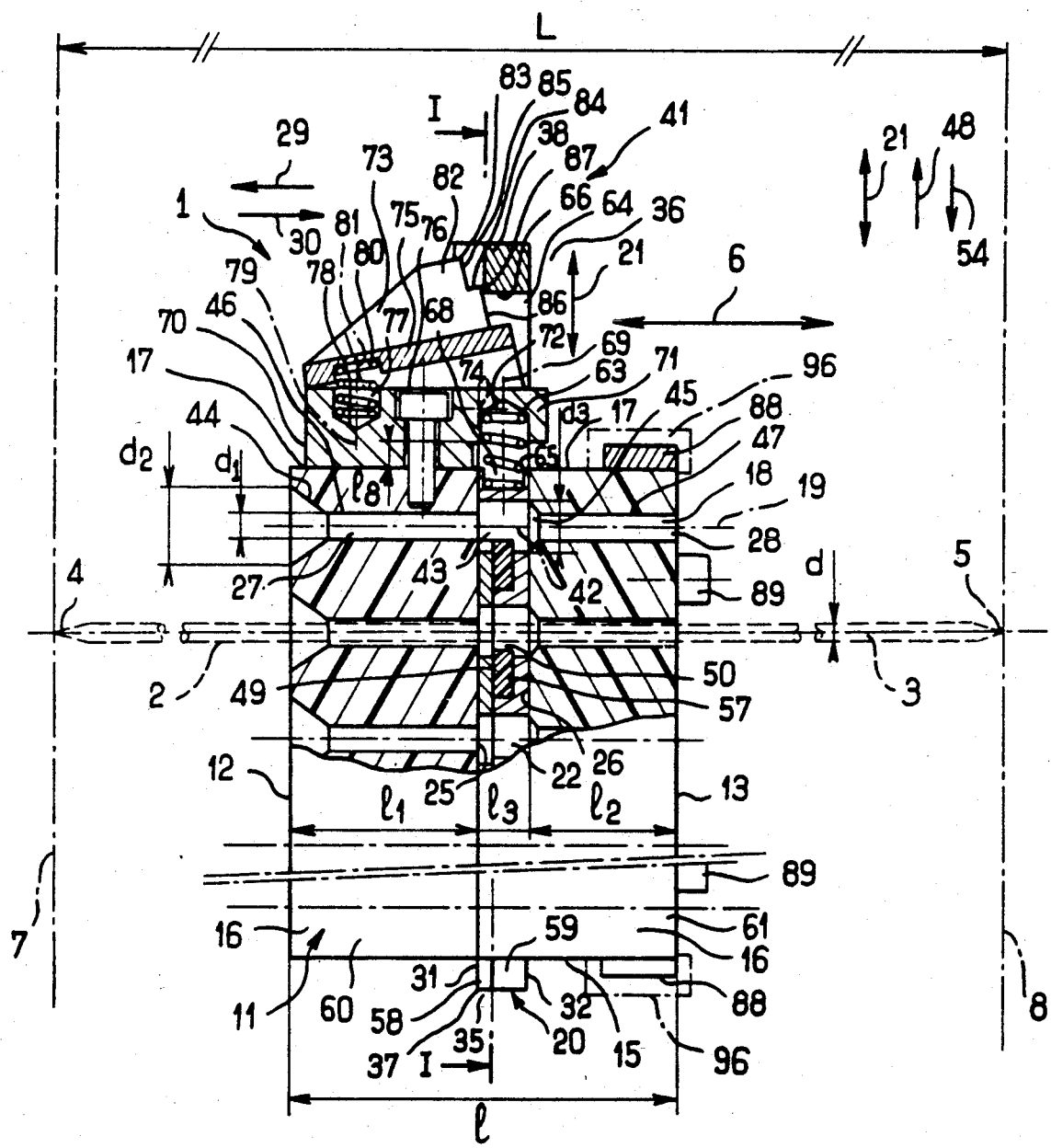
FIGS. 2 and 3 show a view of this temporary retention apparatus partially in section in two half-planes designated by I—I in FIG. 1 in a first state corresponding to that of FIG. 1 and in a second state respectively.

Each of these holes 43 has a cylindrical shape rotational about its respective axis 42 with a diameter substantially equal to the diameter $d_3$, and the axes 42 of the various holes 43 occupy relative to one another and relative to the end faces 33 and 34 of the slide 20 positions identical to those which the axes 19 of the bores 18 occupy relative to one another and relative to the faces 23 and 24 of the slideway 22 of the body 11, in such a way that, as a result of a sliding of the slide 20 relative to the body 11 in the direction 21, the slide 20 can, in particular, be placed in two predetermined positions, namely:

a first position, illustrated in FIGS. 1 and 2, in which each axis 42 coincides with a respective axis 19, with result that, with reference to the way 30, each hole 43 forms a broadening downstream of the portion 27 of the corresponding bore 18, the portion 28 of which corresponds to a downstream narrowing of this hole 43, the frustoconical zone 45 ensuring that this narrowing has progression the way 30; this first relative position allows a free sliding of each skewer 2 within the corresponding bore 18 and corresponding hole 43;

a second position, illustrated in FIG. 3, in which each axis 42 is offset the same way 48 of the direction 21 going from the end faces 15 and 37 towards the end faces 17 and 38, in relation to the axis 19 of the corresponding bore 18, at a distance $l_7$ substantially equal to half the difference between the diameters $d_3$ and $d_2$, in such a way that each hole 43 takes its place in the direct extension of the cylindrical zone 46 of the portion 27 of the respectively corresponding bore 18, on a side of the hole 43 and of this bore 18 located upstream with reference to the way 48; however, this value of $l_7$ is only a non-limiting example, provided that each hole 45 of the slide 20 occupying this second position remains partially in register with the corresponding bore 18 of the body 11 under conditions suitable for allowing the mode of operation which will now be described.

So that this second position of the slide 20 in relation to the body 11 becomes a position immobilizing the skewers 2 within the bores 18, the slide 20 possesses fixedly, on the inside of each of the holes 43, a buffer 49 made of a material which is elastically compressible and/or has a high coefficient of friction, such as a rubber or similar material, this buffer 49 forming a projection within the respectively corresponding hole 43 towards the axis 42 of the latter, on the side of this hole 43 located upstream with reference to the way 48; for example, as illustrated, the buffer 49 possesses, towards the axis 42 of the respectively corresponding hole 43, a plane face 50 oriented perpendicularly to the direction 21, this face 50 being spaced from the axis 42 of the respectively corresponding hole 43 in the direction 21 at a distance $l_8$ greater than the different between the diameters $d_1$ and d and preferably only slightly greater than this difference, whilst remaining smaller than $d_1$, in such a way that, in the abovementioned second position of the slide 20 in relation to the body 11, each buffer 49 comes to bear with its face 50 under slight deformation on a portion 51 of a respective skewer 2 engaged in the hole 43 in question by means of this portion 51, whilst this skewer 2 bears the way 48 against respective zones 46 and 47 of the portions 27 and 28 of the bore 18 by means of a respective portion 52, 53, in a manner distributed approximately equally on either side of the slide 20, without these bearings offset in the longitudinal direction 6 resulting in any deformation of or damage to the skewer 2 in question. It will be seen that, in the first of the abovementioned positions of the slide 20 in relation to the body 11, each buffer 49 is retracted completely the way 54 opposite the way 48 in relation to the portions 27 and 28 of the corresponding bore 18.

The buffers 49 can have various embodiments and, in particular, can be omitted if the slide 20 is itself produced from a material suitable for ensuring that the skewers 2 are immobilized against a longitudinal sliding relative to the body 11, without the risk of damage to the skewers 2, when the slide 20 occupies the second of the abovementioned positions in relation to the body 11; in the example illustrated, the buffers 49 of each row 55 of holes 43 corresponding to the same row 9 of bores 18 of the body 11 consist of the same respective strip 56 of a suitable material, such as rubber or similar material, retained fixedly by pinching and/or adhesive bonding in a respective rebate 57 which the slide 20 possesses in an intermediate position between its main faces 31 and 32, in such a way that, even in the state greatly compressed as a result of contact with a skewer 2, each buffer 49 cannot come into contact with one of the faces 25 and 26 of the slideway 22, at the risk of impeding the sliding of the slide 20 in relation to the body 11 in the direction 21; in the example illustrated, each strip 56 and the corresponding rebate 57 have a rectangular cross-section perpendicularly to the corresponding row 55 of holes 43, as shown in FIG. 3, but the shape of this cross-section could also be different; in particular, in a way which is not shown, but which can easily be imagined by an average person skilled in the art, the cross-section of each strip 56 could be semicircular, or each strip 56 could consist of a juxtaposition in the direction 21, within the corresponding rebate 57, of two bolsters of respective circular cross-section maintained under compressive prestress; the arrangement of the rebates 57 and the insertion of the strips 56 in these can be made easier if, as illustrated, the slide 20 is formed from the mutually fixed superposition of two plates 58, 59, in one of which a bottom and one flank of each rebate 57 are machined and the other of which defines another flank of each rebate 57 in a manner easily understandable to an average person skilled in the art who will also easily understand that the body 11 is itself preferably formed from the mutually fixed superposition of two plates 60 and 61, one of which defines the faces 23, 24, 26 of the slideway 2 by means of suitable machining, whilst the other plate defines the face 25 of the slideway 22.

To stabilize the slide 20 in relation to the body 11 in the first of the abovementioned positions, that is to say in the position corresponding to the coaxiality of the holes 43 with the bores 18, the slide 20 carries fixedly, in the region of its projection 36, means for stopping the way 54 in relation to the body 11; in the example illustrated, these stop means take the form of two dogs 62 which the slide 20 carries fixedly on its main face 31 and which butt against the end face 17 of the body 11 the way 54 when the axes 42 of the holes 43 coincide with the axes 19 of the bores 18.

Furthermore, there are means for the elastic return of the slide 20 towards this mutual stop position of the dogs 62 and of the end face 17 of the slide 20, the way 54, in the form of a helical compression spring 63 arranged in the direction 21 in a mid-position between the two end faces 14 and 16 of the body 11 and between the two end faces 33 and 34 of the slide 20, within an aperture 64 passing right through the slide 20 in the region of its projection 36 in parallel with the axes 42 of its holes 43.

For this purpose, the aperture 64, delimited respectively the way 54 and the way 48 by mutually parallel plane faces 65, 66 perpendicular to the direction 21 and to the faces 31 and 32 which they connect, whilst otherwise delimited by two mutually parallel likewise plane faces 67, 68, likewise parallel to the direction 21, whilst being perpendicular to the faces 31 and 32 which they connect, possesses, in its face 65, a blind hole 68 of an axis 69 parallel to the direction 21 and equidistant from the end faces 33 and 34 of the slide 20 on the one hand and from the main faces 31 and 32 of the latter on the other hand, in order to receive the spring 68 at an end of the latter not bearing a reference numeral. The face 65 of the aperture 64 is flush with the end face 17 of the body 11 when the slide 20 occupies relative to this its position of coaxiality of the holes 43 with the bores 18, and the body 11 carries fixedly by this end face 17, projecting relative to this the way 48 between the face 25 and the main face 12, a piece 70 serving as a mounting intermediary for the abovementioned locking means 41, this piece 70 possessing, projecting inside the aperture 64 of the slide 20 opposite the slideway 22 the way 48, but at a distance l8 from the end face 17 greater than l7, an extension 71 pierced directly opposite the blind hole 68, along the same axis 69, with a blind hole 72 receiving the spring 68 at its second end.

Thus, the spring 68 bearing under prestress, on the one hand, in the blind hole 68 of the face 65 of the aperture 64 of the slide 20 and, on the other hand, in the blind hole 72 of the extension 71 of the intermediate mounting piece 70 the way 54 and the way 48 respectively permanently stresses the slide 20 the way 54, so as to bring it with the dogs 62 up against the end face 17 of the body 11 if nothing opposes this, particularly if the locking means 41 do not retain the slide 20 in its position of mutual misalignment of the holes 45 and of the bores 18, corresponding to the immobilization of the skewers 2 in relation to the apparatus 1.

For this purpose, the locking means 41 comprise a yoke 73 partially penetrating into the aperture 64 of the slide 20 and articulated on the intermediate mounting piece 70 about an axis 74 oriented perpendicularly to the end faces 14 and 16 of the body 1 and located approximately in the geometrical plane, not bearing any reference numeral, of the face 25 between the end face 17 of the body 11 and the face 66 of the aperture 64, whatever the position occupied by the said slide 20 in relation to the body 11 under the normal conditions of use of the apparatus 1, that is to say particularly in either one of the two abovementioned positions and in any intermediate position between these occurring as a result of a sliding of the slide 20 in the direction 21 in relation to the body 11.

Between the axis 74 and the face 66 of the aperture 64, the yoke 73 has a flat web 75 located opposite a plane face 76, perpendicular to the direction 21 and delimiting the intermediate mounting piece 70 in the direction moving away from the end face 17 of the body 11 the way 48, but set back relative to the face 66 of the aperture 64 the way 54; in a locking position of the slide 20 in the said second position of the latter, corresponding to a misalignment of the holes 43 relative to the bores 18, as shown in FIG. 3, the flat web 75 of the yoke 73 is substantially parallel to the face 76 of the intermediate mounting piece 70, in relation to which this web 75 is offset the way 48, whilst in the position of coaxiality of the holes 43 and of the bores 18 illustrated in FIG. 2, the flat web 75 converges relative to the face 76 the way 29 as a result of a relative pivoting about the axis 74.

A helical spring 77 held under compressive prestress between a blind hole 78 arranged in the face 76 of the intermediate mounting piece 70 along an axis 79, located in the direction 21 midway between the end faces 14 and 16 of the body 11, and a blind hole 80 placed opposite this blind hole 78 along the axis 79 of the latter and arranged in the web 75 along an axis 81 coinciding with the axis 79 in the orientation illustrated in FIG. 3 returns the yoke 73 permanently towards this orientation illustrated in FIG. 3.

However, this tendency is opposed by a butting of the yoke 73 against the slide 20 by means of two stop tabs 82 which the yoke 73 carries fixedly, projecting from its web 75 in the direction going away from the axis 74, respectively in the vicinity of the face 67 of the aperture 64 and in he vicinity of the face 68 of the latter, but opposite and partially within this aperture 64.

Referring to the position which the yoke 73 occupies when it ensures the locking of the slide 20 relative to the body 11 in a relative position of mutual misalignment of the holes 43 and of the bores 18, as shown in FIG. 3, each of the stop tabs 82 possesses, in the direction going away from the axis 74, a step 83 delimited by two plane faces 84, 85 arranged at right angles relative to one another; the face 84 parallel to the axis 73 is therefore oriented parallel to the face 76 of the intermediate mounting piece 70 and oriented in the same way as this face 76, that is to say in the direction going radially away from the axis 73, and it is located at a distance l9 from this axis 73 corresponding to the distance separating the face 66 of the aperture 64 of the slide 20 from this axis, in such a way that the face 84 of the step 83 is, when flat, put in contact with a zone of this face 66 adjacent to the main face 31 of the slide 20 and thus prevents the latter from reaching its position of coaxiality of the holes 43 with the bores 18 under the action of the spring 63 by sliding the way 54 in relation to the body 11; the face 85 is itself then coplanar with the face 25 and oriented in the same way as this, being located further from the axis 73 than the face 84, so as, when flat, to bear against a zone of the main face 31 of the slide 20 directly adjacent to the face 66 of the aperture 64 of the latter under the action of the spring 77 which tends to maintain this contact.

The face 84 of the step 83 is connected to the web 75 of the yoke 73 by means of a plane face 86 oriented in the same manner as the face 85, but offset relative to this at a distance $l_{10}$ such that, if the yoke 73 is tilted manually about the axis 74 counter to the axis of the spring 77 until the web 75 makes contact with the face 76 of the intermediate mounting piece 70, as shown in FIG. 3, a way corresponding to a movement of the face 85 of the step 83 away from the main face 31 of the slide 20, the face 66 of the aperture 64 escapes from the face 84 of the step 83, and such that the slide 20 can reach its position of coaxiality of the holes 43 and of the bores 18 by sliding the way 54 in relation to the body 11 under the action of the spring 63; then, under the action of the spring 77, the yoke 73 bears with the faces 86 of the stop tabs 82 against a junction edge 87 between the face 66 of the aperture 64 and the main face 31 of the slide 20.

Subsequently, if the slide 20 is stressed the way 48 in relation to the body 11 until the face 86 of the stop tabs 82 escapes from the edge 87, the yoke 73 stressed by the spring 77 regains its position illustrated in FIG. 3, in which it locks the slide 20 relative to the body 11. It will be seen that a space 250 then still remains in the direction 21 between the face 65 of the aperture 64 of the slide and the outside 71 of the piece 70, with the result that a deliberate movement of the slide 20 in relation to the body 11 the way 48 still remains possible over a sufficient stroke to allow the abovementioned mutual locking and unlocking movements of the slide 20 and of the body 11 as a result of the pivoting of the yoke 73 about the axis 74 in relation to the piece 70.

It is thus certain that the skewers 2 introduced into the bores 18 of the body 11 and the holes 43 of the slide 20 remain immobilized in relation to the apparatus 1, until, as a result of a deliberate unlocking action on the yoke 73, the holes 43 and the bores 18 are restored to coaxiality in order to release the skewers 2 once again.

The apparatus just described can have various accessory arrangements making it easier to handle it and to operate the yoke 73 in the unlocking direction, such as, for example, suitable reliefs of the end faces 14 and 16 of the body 11 and of the yoke 73, in a way not shown, but easily understandable to an average person skilled in the art, and to mount it in an exact positioning on an apparatus for distributing skewers in the various bores 18 of the body 11 and holes 43 of the slide 20 and/or on a machine, such as a skewering machine, intended to be loaded by means of the apparatus 1.

By way of non-limiting example, there are illustrated as means for positioning the apparatus 1 on a skewering machine studs 89 fixed to the body 11 and forming a projection on the main face 13 of the latter so as to penetrate into recesses provided in a complementary manner on a skewering machine (not shown); these studs 89, of which there are, for example, 4, occupy predetermined positions on the face 13 in relation to the positions of the recesses of the skewering machine; as a non-limiting example of means for positioning the apparatus 1 in relation to a skewer distribution apparatus, there are illustrated two rectilinear ribs 88 projecting respectively on the end faces 15 and 17 of the body 11 along the junction of these end faces 15 and 17 with the main face 13 of the body 11, each of these ribs 88, thus arranged parallel to one another perpendicularly to the longitudinal direction 6 and to the transverse direction 21, being capable of interacting with a respective slideway of a skewer distribution apparatus 2, for example of the type described in French Patent Application No. 90 04578 filed on Apr. 10, 1990.

I claim:

1. An apparatus for the temporary retention of a plurality of skewers, such as a loading apparatus of a skewering machine, the said apparatus comprising:

a body having a plurality of bores passing right through it along respective mutually parallel longitudinal axes and occupying specific relative positions, each of the said bores being capable of receiving a respective skewer with a possibility of relative longitudinal sliding, this skewer being maintained in a longitudinal orientation, a transverse slide mounted slideably relative to the body in a specific transverse direction and having as many holes as there are bores of the body, the said holes passing right through it along respective mutually parallel longitudinal axes and occupying relative positions identical to the said specific relative positions, each of the said holes being capable of receiving a respective skewer with a possibility of relative longitudinal sliding, in such a way that, as a result of the sliding of the slide relative to the body in the said transverse direction, the slide can be placed, as desired, in a first position, in which the axes of the holes of the slide coincide with the axes of the bores of the body to allow a free longitudinal passage of the skewers, or in a second position, in which the axes of the holes of the slide are offset transversely a specific way of the said transverse direction in relation to the axes of the bores of the body in order to immobilize the skewers against longitudinal passage, wherein the slide passes through the body at a longitudinally intermediate level of the bores of the latter, in such a way that a substantial portion of each bore of the body is located respectively on either side of the slide and can receive a respective portion of a skewer engaged in this bore, while another portion of this skewer is engaged in a corresponding hole of the slide when the slide occupies its first position, wherein each hole of the slide is partially in register with the corresponding bore of the body when the slide occupies its second position, in such a way that the slide can occupy its second position when a skewer has a respective portion in this hole of the slide and in each portion of the corresponding bore of the body, and wherein the slide possesses, at the edge of each hole, at least in a localized manner on the upstream side of this hole with reference to the said specific way, a means for bearing transversely the said specific way against a skewer having a respective portion in this hole of the slide and in each portion of the corresponding bore of the body when the slide occupies its second position, in order to immobilize this skewer frictionally against longitudinal passage.

2. The apparatus as claimed in claim 1, wherein the said transverse bearing means is a buffer of a material having a high coefficient of friction, attached fixedly to the slide.

3. The apparatus as claimed in claim 1, wherein the transverse being means is a buffer of an elastically compressible material, attached fixedly to the slide.

4. The apparatus as claimed in claim 1, wherein the slide passes through the body at a level corresponding approximately to half of each bore of the body.

5. The apparatus as claimed in claim 1, wherein there are means for locking the slide relative to the body, as desired, when the slide occupies its second position.

6. The apparatus as claimed in claim 1, wherein there are means for the elastic return of the slide the opposite way to the said specific way of the said transverse direction from its second position to its first position, and stop means opposing the sliding of the slide the said opposite way in relation to the body beyond the said first position.

7. The apparatus as claimed in claim 1, wherein each hole of the slide has a diameter larger than the diameter of the corresponding bore of the body.

8. The apparatus as claimed in claim 7, wherein the portions of each bore of the body which are located downstream of the slide with reference to a specific longitudinal way of longitudinal sliding of the skewers are widened in the upstream direction with reference to this way.

9. The apparatus as claimed n claim 1, wherein the portions of each bore of the body which are located upstream of the slide with reference to a specific longitudinal way of longitudinal sliding of the skewers are widened in the upstream direction with reference to this way.

10. The apparatus as claimed n claim 1, wherein the body has means for positioning in relation to an apparatus for distributing skewers among the said bores and/or in relation to a skewering machine.

* * * * *